United States Patent [19]

Martino et al.

[11] Patent Number: 5,567,781

[45] Date of Patent: Oct. 22, 1996

[54] COATING COMPOSITIONS CONTAINING HIGH MOLECULAR WEIGHT POLYESTER-EPOXY COPOLYMERS AND HAVING IMPROVED RESISTANCE TO FAILURE DURING FABRICATION

[75] Inventors: Phillip C. Martino, Gibsonia; Kenneth G. Davis, Pittsburgh, both of Pa.

[73] Assignee: The Valspar Corporation, Minneapolis, Minn.

[21] Appl. No.: 485,668

[22] Filed: Jun. 7, 1995

Related U.S. Application Data

[63] Continuation of Ser. No. 11,362, Jan. 29, 1993, abandoned.

[51] Int. Cl.⁶ .................. C08F 20/00; B32B 27/06
[52] U.S. Cl. .................. 525/438; 525/441; 525/530; 525/533; 528/112; 528/289; 528/297; 428/418; 428/458; 428/482
[58] Field of Search .................. 525/438, 441, 525/530, 533; 528/112, 297, 289; 428/418, 458, 482

[56] References Cited

U.S. PATENT DOCUMENTS

| | | | |
|---|---|---|---|
| 3,308,077 | 3/1967 | Pattison et al. | 260/23 |
| 3,650,997 | 3/1972 | Weisfeld | 260/21 |
| 3,939,051 | 2/1976 | Anderson et al. | 204/181 |
| 4,064,026 | 12/1977 | Kaufman | 204/159.19 |
| 4,164,487 | 8/1979 | Martin | 260/29.2 |
| 4,247,439 | 1/1981 | Matthews et al. | 260/29.6 |
| 4,308,121 | 12/1981 | Hazan | 204/181 |
| 4,397,970 | 8/1983 | Campbell et al. | 523/402 |
| 4,442,246 | 4/1984 | Brown et al. | 523/404 |
| 4,446,258 | 5/1984 | Chu et al. | 523/406 |
| 4,476,262 | 10/1984 | Chu et al. | 523/412 |
| 4,480,058 | 10/1984 | Ting et al. | 523/404 |
| 4,584,353 | 4/1986 | Kobayashi et al. | 525/438 |
| 4,767,829 | 8/1988 | Kordomenos et al. | 525/528 |
| 4,816,528 | 3/1989 | Dervan et al. | 525/533 |
| 4,927,895 | 5/1990 | Nakane et al. | 525/438 |
| 4,933,429 | 6/1990 | McCracken et al. | 525/438 |
| 4,942,219 | 7/1990 | Yatsuka et al. | 525/438 |
| 4,981,905 | 1/1991 | Simons et al. | 524/603 |
| 5,168,110 | 12/1992 | Van Den Elshout et al. | 525/438 |

FOREIGN PATENT DOCUMENTS

| | | |
|---|---|---|
| 0049868 | 4/1982 | European Pat. Off. . |
| 0111986 | 12/1983 | European Pat. Off. . |
| 0399108 | 5/1989 | European Pat. Off. . |
| 0384578 | 8/1990 | European Pat. Off. . |
| 1920972 | 11/1969 | Germany . |
| 3301729 | 7/1984 | Germany . |
| 8802743 | 8/1988 | WIPO . |

OTHER PUBLICATIONS

Lee & Neville, "Handbook of Epoxy Resins", 1982 Reissue pp. 4–14.

Pamphlet entitled "Cyanamid High Solids Amino Cross-Linking Agents," by American Cyanamid Company, Sep. 1982.

*Primary Examiner*—John C. Bleutge
*Assistant Examiner*—Randy Gulakowski
*Attorney, Agent, or Firm*—Fredrikson & Byron, PA

[57] ABSTRACT

A liquid coating composition particularly adapted for coating cans. The composition comprises a curable, hydroxyl functional block copolymer which is the reaction product of a 1,2-epoxy resin and a carboxyl functional polyester resin, and a hydroxyl-reactive crosslinking agent providing desirably at least 2.0 equivalents of hydroxyl reactive functional groups per hydroxyl equivalent of the block copolymer. The block copolymer desirably has a number average molecular weight in the range of 7000 to 30,000. Also disclosed is a method for formulating a coating composition utilizing craze resistance testing over an aging period to enable the choice of the quantity of curing agent to be used in the coating composition.

12 Claims, No Drawings

COATING COMPOSITIONS CONTAINING HIGH MOLECULAR WEIGHT POLYESTER-EPOXY COPOLYMERS AND HAVING IMPROVED RESISTANCE TO FAILURE DURING FABRICATION

This application is a continuation of application Ser. No. 08/011,362, filed Jan. 29, 1993, now abandoned.

BACKGROUND OF THE INVENTION

High molecular weight polyesters prepared from diacids and dihydric alcohols have found extensive use in a variety of commercial products. Their excellent ductility and flexibility have found utility in fibers for apparel, carpeting, and tire cord. In addition, they are widely used in thin film applications such as magnetic tape and product packaging.

In recent years, high molecular weight polyesters have found increasing use as metal coatings, particularly in applications requiring a high degree of extensibility such as when coated metal sheeting is formed by drawing into cans or can ends that are used to package foods. However, these polymers suffer from a lack of solvent resistance since only their end groups are reactive with crosslinking agents. This fact, coupled with the very short oven bake conditions used in these types of applications, lead to very low levels of crosslinking in the baked film and poor resistance to solvents, particularly to those solvents that swell the film.

This lack of solvent resistance is addressed in European Patent Applications 0111986A2 and 0399108A1 which teach a two step process for preparing high molecular weight polyesters. A low molecular weight carboxylic acid terminated polyester prepolymer is first prepared and is then reacted with a diepoxide to further continue the chain building process. Each new polymer linkage formed between a carboxyl group of the prepolymer and an oxirane group of the epoxy resin consists of an ester group and a secondary alcohol. The alcohol serves as a locus for crosslinking which can be accomplished by thermally activated aminoplast or phenoplast curing agents. However, coatings made from such polymers may be subject to crazing, particularly after aging.

SUMMARY OF THE INVENTION

We have found that the protective coatings containing polymers as are thus prepared suffer from a loss in flexibility with time upon drawing, as evidenced by the degree of crazing that results from subjecting the coatings to drawing through the use of the well known reverse impact crazing test. The ability of the coating to resist crazing is reduced over time. We have found that this age to craze time is a strong function of polymer molecular weight and the crosslink density in the polymeric coating. For a given resistance to crazing after aging for a predetermined time, we have found that the lower the molecular weight of the polymer, the higher must be the crosslink density. However, if the polymer molecular weight is particularly low, the crosslink density required is so high that the coating material will no longer withstand the severe stresses introduced during the deformation of the metal.

In practical metal coating applications, we have found that best results are obtained when the number average molecular weight of the polyester polymer (that is, of the reaction product of the polyester prepolymer and the epoxy resin) is at least 7,000 and when the crosslink density is at a level sufficient to essentially prevent crazing during reverse impact for a period of aging at room temperature of 10 days following curing of the coating.

The reason for the loss over time of a coating's resistance to drawing is not entirely clear, but it appears to be related to a "freezing in" of free volume that occurs when the coating is subjected to rapid cooling after oven baking. Over time, at room temperature, the coating becomes more dense and less flexible as the free volume diminishes. When the molecular weight is sufficiently high to give extensive chain entanglements, or if the crosslink density is sufficiently high, the polymer chains are restricted in their motions so that the loss of free volume is minimized.

In our invention, we prepare a carboxyl functional prepolymer from a mixture containing one or more diacids and one or more dihydric alcohols using an excess of carboxyl groups over hydroxyl groups. After the hydroxyl groups are substantially reacted and the water of esterification is substantially removed, the carboxyl terminated prepolymer is reacted with a diepoxide under base catalysis using either a slight excess of epoxy groups or carboxyl groups depending on the type of terminal functional group considered most desirable for the application contemplated. The reaction between the acid group of the carboxyl functional prepolymer and an oxirane group of the epoxy resin produces an ester linkage and a secondary alcohol which may be used as the locus for subsequent crosslinking. To the resulting hydroxyl functional polymer is added sufficient crosslinking agent as to provide a high crosslink density in the product when cured.

Thus, in one embodiment, the invention relates to a method of forming a metal substrate bearing a draw-resistant coating, which comprises applying to the substrate a curable liquid coating composition and curing the coating by subjecting it to a predetermined temperature for a predetermined time. The liquid coating composition comprises a hydroxyl-functional block copolymer polyester reaction product of an epoxy resin and a carboxyl-functional polyester. A hydroxyl-reactive crosslinking agent is employed to provide a sufficiently high crosslink density so that the craze resistance of the coating as measured by reverse impact testing, when cured at the predetermined temperature and time, diminishes by no more than 20% when aged at room temperature for a ten day period or under equivalent aging conditions.

In another embodiment, the invention relates to a liquid coating composition for coating cans or other containers, the composition comprising a curable hydroxyl-functional block copolymer polyester reaction product of a 1,2-epoxy resin and a carboxyl-functional polyester resin, and a sufficient quantity of a hydroxyl-reactive crosslinking agent to provide at least 2.0, preferably from 2.5 to 10, and most preferably 3 to 7 equivalents of hydroxyl-reactive functional groups per hydroxyl equivalent of the block copolymer. Desirably, the hydroxyl-reactive crosslinking agent is present at a concentration of no more than 40% by weight based on the combined weight of the crosslinking agent and the polyester resin.

In yet another embodiment, the invention relates to a method of formulating a coating composition to produce craze-resistant coatings, comprising a. providing aliquots of a curable hydroxyl-functional block copolymer polyester reaction product of a 1,2-epoxy resin and a carboxyl-functional polyester resin mixed with varying amounts of a crosslinking agent capable of reacting with hydroxyl functionality of the block copolymer;

b. subjecting cured coatings on metal of such aliquots to craze-resistance testing periodically over at least a ten day aging period at room temperature or the equivalent and determining the loss in craze resistance over said period; and c. choosing for the coating composition an amount of said crosslinking agent corresponding to the aliquot yielding no more than 20% loss in craze resistance over said period.

DESCRIPTION OF THE PREFERRED EMBODIMENT

While any diacid is useful in forming the polyester prepolymer reactant, satisfactory materials can be produced using such readily available acids as phthalic acid, adipic, succinic, sebacic or dimer acid. Similarly, common dihydric alcohols can be employed, including ethylene glycol, propylene glycol, butylene glycol, neopentyl glycol, cyclohexane diol, hexane diol, or the polyethers derived from these components. Polymerization occurs as a polycondensation reaction and is generally carded out at a temperature of from about 190° C. to about 250° C. and in an inert atmosphere of nitrogen, carbon dioxide or the like. The water formed in the condensation reaction may be removed by distillation under reduced pressure, azeotropic distillation, etc. The diacid is used in excess so as to provide the prepolymer with an acid number in the range of 20 to 100 and preferably 30 to 70, and a number average molecular weight in the range of 1100 to 5600. Esterification catalysts such as p-toluene sulfonic acid may be used.

Any diepoxide resin may be used, but the most useful for food packaging application are based on bisphenol A and epichlorohydrin, since these epoxy resin compounds are regulated in the United States by the Food and Drug Administration. The preferred epoxy resins are liquids at room temperature and have epoxy values (referred to as "EV" values in the mathematical treatment below) ranging from about 5.5 to about 1 milliequivalents of epoxide per gram.

The 1,2-diepoxide resin desirably has a number average molecular weight ranging from about 360 to about 3,600 and more preferably from about 360 to about 2000. A 1,2-diepoxide resin product of Shell Chemical Co. sold under the trademark Epon 828 having a number average molecular weight of approximately 385 and an epoxide equivalent weight of 185–192 has given good results. Low molecular weight epoxy resins such as Epon 828 may be chain extended by reaction with, e.g., Bisphenol A. In its preferred embodiment, the invention makes use of a 1,2-diepoxide resin having an epoxy functionality of 1.8 to 2 and an epoxy equivalent weight of 180 to 1800 and more particularly 180 to 1000.

The important properties of the block copolymer that need to be controlled include glass transition temperature (Tg), solubility parameter, viscosity and molecular weight. Solubility parameter and Tg are controlled by selecting components that are more or less polar, and that contribute hardness or softness to the polymer, as is well known to those skilled in the art. For example, selection of components having long aliphatic carbon chains lowers Tg, while selection of components having ring structures or bulky side chains raises Tg. Tg can be measured by well known techniques such as differential scanning calorimetry or torsion braid analysis. Solubility parameter is not normally measured, but components should be selected based on their known effect and selected to provide a value that is as far removed as practical from the solvents that will be contacted with the polymer during its useful life. For example, if water is the principal solvent, components should be selected having as low a value of solubility parameter as practicable. Thus, components that are water soluble should be used sparingly.

For metal coating applications requiring a high degree of extensibility, the Tg should be controlled below 100° C., preferably below 60° C. In general, the lower the Tg, the lower the probability of brittle failure of the coating during fabrication of the finished article but the more likely is the tendency of the coating to block (i.e., to adhere to another surface) when the coated metal is stacked in sheets or rolled as a coil. The lower limit of Tg thus is chosen to be sufficiently high so as to avoid blocking of the coating. Tg preferably is not lower than about 25 ° C.

The viscosity of the epoxy-polyester block copolymer is controlled principally by its weight average molecular weight. The weight average molecular weight is controlled by the number average molecular weight and the polydispersity of the molecular weight distribution. For linear polyesters, the weight average is about 2 times the number average.

Thus, in order to control the viscosity of linear polyesters, it is sufficient to control the number average molecular weight. Both the number and weight average molecular weights can be measured most conveniently by gel permeation chromatography.

The number average molecular weight of linear polyester-epoxy block copolymers used in the present invention may be calculated and controlled by use of the following definitions and relationships.

An= Acid number of polyester prepolymer, mg KOH/gm

Bn= Hydroxyl number of polyester prepolymer, mg KOH/gm e=Average functionality of diepoxide EV= Epoxy value of diepoxide, milliequivalents/gm R= Ratio of acid groups in prepolymer to epoxy groups of the epoxy resin P=Fractional conversion of acid or epoxy groups, whichever is present in lesser amount.

Mn=Number average molecular weight of block copolymer.

For $R > 1.0$ $$Mn = \frac{112{,}000 + 2000 An/(EV \times R)}{Bn + \frac{(2-e)}{e} \frac{An}{R} + An \frac{(1+R-2P)}{R}}$$

For $R < 1.0$ $$Mn = \frac{112{,}000 + 2000 An/(EV \times R)}{Bn + \frac{(2-e)}{e} \frac{An}{R} + An \frac{(1+R(1-2P))}{R}}$$

For $R = 1$ $$Mn = \frac{112{,}000 + 2000 An/EV}{Bn + \frac{(2-e)}{e} + 2An(1-P)}$$

In the calculation for Mn, the numerator represents the mass of ingredients in the charge while the denominator measures the end groups due to unreacted hydroxyl groups in the prepolymer, the unreactive groups present in the diepoxide, and the residual epoxy and acid groups left over due to incomplete reaction and inexact stoichiometry of the reactant charge.

As an example, consider a prepolymer having an acid number of 50 that is reacted with a diepoxide having an epoxy value (EV) of 5.35 meq/gm under stoichiometric conditions where R=1.0. The numerator in the molecular weight expression is equal to 130,692. Thus, if we desire a molecular weight (Mn) of 30,000, we must control the number of end groups to 130,692/30,000=4.36.

Proceeding further with this example, the target number of end groups can be achieved by controlling the hydroxyl number at a level of 2, by using a diepoxide of functionality 1.95, and by carrying out the reaction to 9955 completion. Substituting Bn=2.0, e=1.95 and p=0.99 into the expression for R=1 gives a value of 4.28 which is close to the value of 4.36 desired.

In general, the closer R is to 1.0, the lower the acid number of the polyester and the closer the functionality of the epoxy resin is to 2.0, then the higher the molecular weight of the polymer will be when all other conditions remain the same. While there is no theoretical upper limit on molecular weight, a practical limit of about 60,000 appears likely.

In metal coating applications, number average molecular weights of the block copolymer in the range of 7,000 to 30,000 are sufficient to meet the current requirements of extensibility and are consequently preferred so as to keep the amount of organic solvent required to a minimum.

The acid number of the prepolymer may be used to effect molecular weight as described above. In addition, the acid number may be used to control the amount of diepoxide required. This is evident from the following relationship which gives the weight fraction of diepoxide ($W_E$) in the polymer:

$$W_E = \frac{An}{An + 56RxEV}.$$

Thus for An=50, EV=5.35, and R=1.0, then $W_E$=0.143.

Repeating the calculation for An=100, then $W_E$=0.25. Similarly, the weight fraction diepoxide can be controlled by varying the epoxy value of the diepoxide. For example, for An=50, R=1.0, EV=1.0, then $W_E$=0.47. Repeating the calculation for An=100, then $W_E$=0.64. The values of An and EV employed are not critical in the present invention and thus are controlled by practical considerations. For ease of handling, liquid diepoxides are preferred. In the case of diepoxides based on bisphenol A and epichlorohydrin, an epoxy value of about 3 to about 5.5 is most convenient since this provides an easily handled liquid. The An value also is controlled by practical considerations. For example, if the targeted acid number is too low, the reaction time required to achieve a sufficiently low hydroxyl number (Bn) becomes excessively long and more difficult to achieve. If, on the other hand, the acid number is too high, then the amount of diepoxide required increases. Since the diepoxide component is generally more expensive than the polyester prepolymer component, the cost of the product may thus be increased. Another difficulty that is encountered through the use of prepolymers having high acid numbers is the difficulty of solubilizing the diacid reactant when using sparingly soluble acids such as terephthalic acid. Thus, the practical range of An lies between about 20 and 100, with the most preferred range between 30 and 70.

In addition to minimizing the residual hydroxyl groups present in the prepolymer, it is important to minimize the amount of water introduced into the reactor during the reaction of prepolymer with the diepoxide. While any method may be used to ensure that all materials are dry, it is most convenient to react any water present with a diacid anhydride such as phthalic anhydride. Diacid anhydrides are also useful to remove the last traces of hydroxyl groups present in the prepolymer. Careful attention to purity of materials, control of end groups during reaction, and elimination of water all lead to successful preparation of the high molecular weight polymers essential to the practice of this invention.

With regard to crosslink density, any of the well known hydroxyl-reactive curing resins can be used. Phenoplast and aminoplast curing agents are preferred, as are curing agents derived from phosphoric acid. Aminoplast resins are the condensation products of aldehydes such as formaldehyde, acetaldehyde, crotonaldehyde, and benzaldehyde with amino or amido group-containing substances such as urea, melamine and benzoguanamine. Useful alcohols include the monohydric alcohols such as methanol, ethanol, propanol, butanol, hexanol, benzyl alcohol, cyclohexanol, and ethoxyethanol. Urea-formaldehyde and esterified melamine-formaldehyde curing agents are preferred. Particularly preferred are the ethoxy methoxy melamine formaldehyde condensation products, exemplary of which is American Cyanamid's CYMEL® 325 curing agent. Phenoplast resins include the condensation products of aldehydes with phenol. Formaldehyde and acetaldehyde are preferred aldehydes. Various phenols can be employed such as phenol, cresol, p-phenylphenol, p-tert-butylphenol, p-tert-amylphenol, and cyclopentylphenol. As examples of other generally suitable curing agents are the blocked or non-blocked aliphatic, cycloaliphatic or aromatic di-, tri- or polyvalent isocyanates such as hexamethylene diisocyanate, cyclohexyl- 1,4-diisocyanate and the like. The level of curing agent required will depend on the type of curing agent, the time and temperature of the bake, and the molecular weight of the polymer.

Generally, curing agent levels will fall in the range of 8 to 40 wt. % of the combined weight of the epoxy-polyester block copolymer and the curing agent. As noted earlier, we have found that the crosslink density of the cured coating controls what we believe to be the loss of free volume upon aging, and that the crosslink density hence also is related to the ability of a coating of the invention to withstand subsequent drawing or other fabrication procedures to which coated substrates are subjected. Although a variety of metal drawing tests may be employed, we prefer a reverse impact test of 16 inch pounds performed at room temperature and as described generally in American Society for Testing Materials test designations ASTM D 1709 and ASTM D 3029. In this test, a weighted projectile having a hemispherical striking surface is dropped upon a coated metal panel that is supported coating side down on a suitable anvil. The coated test panels are aged at room temperature for various periods and are periodically subjected to the reverse impact test. The thus tested specimens exhibit a dome-shaped deformation where they are struck, and the coating at the apex of the dome is carefully visually examined and is rated from 1 to 10. A rating of 10 indicates that the coating at the apex is visually identical to the surrounding, unstressed coating. A rating of 1 indicates that the coating on the dome-shaped deformation has turned white due to crazing. A coating having a very slightly perceptible haze at the apex of the dome earns a rating of 9. The hydroxyl-reactive crosslinking agent is employed in sufficient quantity to provide a sufficiently high crosslink density so that the craze resistance of the cured coating as measured above by reverse impact testing, diminishes by no more than 20% when aged at room temperature for a ten day period or under equivalent time and temperature aging conditions. Preferably, the molar ratio of hydroxyl-reactive functional groups in the crosslinking agent to the reactive hydroxyl groups of the block copolymer is at least 2.0, preferably is in the range of 2.5 to 10 and most preferably ranges from 3 to 7.

For metal coating applications, the preferred embodiment of the present invention employs a carboxyl-functional prepolymer having an acid number between 20 and 100 most preferably between 30 and 70. The glass transition temperature of the block copolymer preferably is less than 60° C. and its number average molecular weight is between 7,000 and 60,000, and most preferably between 7,000 and 30,000. The coating composition includes a crosslinking agent at a concentration of from about 8 to about 40 wt % but in any event in sufficient concentration to provide a crosslink density high enough so that its resistance to crazing upon being drawn (as may be measured by reverse impact testing) decreases by no more than 20% over a ten day period at room temperature. Most preferably, the molar ratio of hydroxyl-reactive functional groups in the crosslinking agent to the reactive hydroxyl groups of the block copolymer is between 3 and 7. Further, the epoxide value of the epoxy resin precursor preferably is between 5.5 and 3.0.

The coating compositions of the invention may contain such common ingredients as pigment, solvent, fillers, dyes, leveling agents and other surface active agents and the like. In a preferred embodiment, the composition is free from pigment and other opacifying ingredients and forms a clear coating. The following examples are provided to illustrate the invention.

EXAMPLE #1

PREPARATION OF AN ACID END CAPPED POLYESTER PREPOLYMER

The components listed below were charged to a 5 liter round bottom reaction flask equipped with steam and water condensers, heating mantle, mechanical stirrer, thermometer, and inert gas source. The polycondensation reaction was carded out at 200°–240° C. under an inert nitrogen atmosphere. Water was removed by atmospheric distillation until reflux terminated. At this point the reactor contents were cooled to 200° C. and xylene, item #5, was charged to the reactor. Heat was reapplied and azeotropic distillation was continued until an acid value of about 50 was achieved and no further water could be removed from the reaction vessel.

| Item # | MATERIAL | GRAMS |
|---|---|---|
| 1 | Terephthalic Acid | 1447 |
| 2 | Isophthalic Acid | 1447 |
| 3 | Diethylene Glycol | 1665 |
| 4 | Fascat 4201[1] | 6 |
| 5 | Xylol | 100 |
| | | 4665 |

[1]A product of ATOCHEM Company

Approximately 543 grams of distillate were removed from the reactor during the distillation procedure. The resultant polyester prepolymer had an acid number of 54.1 mg KOH/gm. and a determined solids of 94.7%.

EXAMPLE #2

PREPARATION OF A PREDOMINANTLY ACID END CAPPED POLYESTER-EPOXY COPOLYMER

The components listed below were charged to a 1 liter two piece reaction flask equipped with water condenser, heating mantle, mechanical stirrer, thermometer, and inert gas source.

| Item # | MATERIAL | GRAMS |
|---|---|---|
| 1 | Polyester Prepolymer from Example #1 | 415 |
| 2 | DER 383[2] | 69 |
| 3 | Tributylamine | 2 |
| 4 | Cyclohexanone | 170 |
| 5 | Xylol | 113 |

[2]A product of the Dow Chemical Company

The reactor contents were heated to 125° C. under an inert nitrogen atmosphere until essentially all epoxy was consumed and a final acid value of 5 or less was determined. The resultant polymer solution had a determined solids of 65.3%, a determined acid number of 3.1 mg KOH/gm., and final measured molecular weights of 45,600 (Mw) and 16,700 (Mn).

EXAMPLE #3

EXTENT OF CROSSLINKING VS. CRAZE RESISTANCE

The resin prepaxed in sample 2 was blended with several levels of Cymel 325[3] crosslinking agent and applied at 7.5 mg/in$^2$ to treated aluminum panels. The panels were baked for 9 seconds to a peak metal temperature of 450° F. and were immediately water quenched upon exiting the oven. The effect of crosslinking agent level is shown in the following table, in which the weight percent of the crosslinking agent is based on the combined weight of the crosslinking agent and the polyester resin:

[3]A product of American Cyanamid Company

| | WT % CROSS-LINKING AGENT | | CRAZE RATING AT | | | | |
|---|---|---|---|---|---|---|---|
| POLY-MER | Mole Ratio | W/% | 0 HRS | 1 HR | 1 DAY | 5 DAYS | 10 DAYS |
| 100 | 0 | 0 | 9 | 4 | 5 | 2 | 2 |
| 95 | 1.17 | 5 | 10 | 9 | 7 | 4 | 3 |
| 90 | 2.35 | 10 | 10 | 10 | 9 | 7 | 6 |
| 85 | 3.5 | 15 | 10 | 10 | 10 | 8 | 8 |
| 80 | 4.7 | 20 | 10 | 10 | 10 | 9 | 9 |

From the data above it is clear that for the crosslinking agent and cure condition chosen, the crosslinking agent level preferred is ≧15 %.

What is claimed is:

1. A method of forming a metal substrate bearing a draw-resistant coating, which comprises applying to the substrate a curable liquid coating composition and heat curing the coating, the liquid coating composition comprising a hydroxyl-functional block copolymer polyester reaction product of an epoxy resin and a carboxyl-functional polyester, and a hydroxyl-reactive crosslinking agent providing a sufficiently high crosslink density so that the craze resistance of the heat cured coating upon drawing diminishes by no more than 20% when aged at room temperature for a ten day period.

2. The method of claim 1 wherein the molar ratio of functional groups in the crosslinking agent to reactive hydroxyl groups in the block copolymer polyester resin is at least 2.0.

3. The method of claim 1 wherein the coating composition is pigment-free.

4. The method of claim 1 wherein said epoxy resin is a liquid at room temperature and has an epoxy value of from 5.5 to 3 miltiequivalents/gm.

5. The method of claim 1 including the step of measuring said craze resistance by reverse impact testing.

6. A liquid coating composition for coating cans or other containers, the composition comprising a curable hydroxyl-functional block copolymer polyester reaction product of a 1,2-epoxy resin and a carboxyl-functional polyester resin, and a sufficient quantity of a hydroxyl-reactive crosslinking agent to provide at least 2.0 equivalents of hydroxyl-reactive functional groups per hydroxyl equivalent of the block copolymer, and which gives a sufficiently high crosslink density so that the craze resistance of the heat cured coating upon drawing diminishes by no more than 20% when aged at room temperature for a ten day period.

7. The coating composition of claim 6 wherein the crosslinking agent is present at a concentration not greater than 40% based on the combined weight of the crosslinking agent and the polyester resin.

8. The coating composition of claim 6 wherein the ratio of equivalents of hydroxyl-reactive functional groups per hydroxyl equivalent of the block copolymer is in the range of 2.5 to 10.

9. The coating composition of claim 6 wherein the block copolymer has a Tg not greater than 60° C. and a number average molecular weight in the range of 7000 to 60,000.

10. The coating composition of claim 6 wherein said curable hydroxyl-functional block copolymer polyester is the reaction product of sufficient relative quantities of a 1,2-epoxy resin having from 1 to 5.5 epoxide milli-equivalents/gm and a carboxyl-functional polyester resin having an acid number in the range of 20–100 to provide the copolymer with a number average molecular weight ranging from 7000 to 30,000.

11. Method of formulating a coating composition to produce craze-resistant coatings, comprising a. Providing aliquots of a curable hydroxyl-functional block copolymer polyester reaction product of a 1,2-epoxy resin and a carboxyl-functional polyester resin mixed with varying amounts of a crosslinking agent capable of reacting with hydroxyl functionality of the block copolymer;

b. Subjecting cured coatings on metal of such aliquots to craze-resistance testing periodically over at least a ten day aging period at room temperature or the equivalent and determining the loss in craze resistance over said period; and c. Choosing for the coating composition an amount of said crosslinking agent corresponding to the aliquot yielding no more than 20% loss in craze resistance over said period.

12. The method of claim 11 wherein said aliquots of said reaction product contain amounts of crosslinking agent providing a ratio of equivalents of hydroxyl reactive functional groups per hydroxyl equivalent of the block copolymer in the range of 2.5 to 10.

* * * * *